United States Patent [19]
Schmidt et al.

[11] Patent Number: 5,208,052
[45] Date of Patent: May 4, 1993

[54] HOT RUNNER NOZZLE ASSEMBLY

[75] Inventors: Harald Schmidt, Georgetown; Fong F. Sit, Toronto, both of Canada

[73] Assignee: Husky Injection Molding Systems Ltd., Bolton, Canada

[21] Appl. No.: 793,633

[22] Filed: Nov. 18, 1991

[51] Int. Cl.⁵ ............................................. B29C 45/20
[52] U.S. Cl. ................................. 425/549; 219/421; 264/328.15; 425/568; 425/572
[58] Field of Search ............... 425/547, 549, 568, 572; 264/328.15; 219/421

[56] References Cited

U.S. PATENT DOCUMENTS

| | | | |
|---|---|---|---|
| 4,344,750 | 8/1982 | Gellert | 425/549 |
| 4,663,811 | 5/1987 | Gellert | 425/549 |
| 4,777,348 | 10/1988 | Gellert | 219/421 |
| 4,964,795 | 10/1990 | Tooman | 425/549 |

*Primary Examiner*—Tim Heitbrink
*Attorney, Agent, or Firm*—Bachman & LaPointe

[57] ABSTRACT

Hot runner nozzle assembly including a mold assembly with a mold cavity therein, an inlet port in the mold assembly communicating with the mold cavity, an injection nozzle for delivering molten resin to the inlet port and an insulating sleeve positioned around the nozzle between the mold assembly and nozzle insulating the nozzle from the mold assembly.

14 Claims, 4 Drawing Sheets

HOT RUNNER NOZZLE ASSEMBLY

BACKGROUND OF THE INVENTION

The present invention resides in a leak proof nozzle assembly in a hot runner injection molding apparatus.

Hot runner nozzle tips may include single or multiple outlet channels for feeding molten resin to a mold cavity in an injection molding system. The hot runner nozzle tips are generally spaced from the injection gate leading to the mold cavity. The spacing is necessary to avoid direct contact between the cooled mold cavity by the heated nozzle tip in order to prevent the nozzle tip from rapidly cooling. Rapid cooling of the nozzle would cause the resin to freeze up and render the nozzle inoperable. In addition, if the nozzle tip is heated from a cold condition to its operating temperature, generally 350°-450° F., space must be provided for thermal expansion which results in the nozzle and the nozzle tip growing in length.

Conventional hot tip designs usually provide a bubble or resin space surrounding the tip and filled with resin. The resin in the resin space has poor thermal conductivity compared to steel and effectively insulates the hot tip from the cooled mold cavity. U.S. Pat. No. 4,312,630 is an example of this design and shows the heated tip insulated from the mold cavity by a bubble well or resin space. Since the resin in the bubble well is subjected to high injection pressure (around 20,000 psi) it must be effectively sealed. This is accomplished in U.S. Pat. No. 4,312,630 by the close fit between the nozzle shell and the sides of the well.

This method of sealing is not entirely satisfactory and was further improved by making the sealing flange of the nozzle from a separate material, generally titanium, so that less heat would be conducted from the heated nozzle body to the mold cavity. Examples of this are shown in U.S. Pat. Nos. 4,053,271, 4,557,685, 4,768,945 and 4,771,534. The sealing action is achieved while permitting the longitudinal thermal expansion of the nozzle to occur unrestricted. The sealing rings will slide within the cylinder bores of the bubbles and will deform inwardly to maintain the seal. Furthermore, the internal injection pressure of the resin acting on the nozzle surface of the seal tends to urge the skirt of the seal against the sides of the bubble walls to enhance the sealing action.

It was soon realized, however, that the comparatively large volume of resin contained in the bubble or resin space tended to remain there indefinitely. Some resins could tolerate this extended dwelling time at their processing temperatures, but others could not. The resins which could not tolerate the extended elevated temperature dwell are known as heat sensitive resins and soon degrade when exposed to extended periods of time at their normal processing temperatures. Typical of these heat sensitive resins are polyacetal, polyvinyl chloride and polyethylene terephthalate.

In order to solve this problem, sealing arrangements were developed to minimize and in some cases entirely eliminate the bubble or resin space while at the same time attempting to maintain good thermal insulation between the nozzle tip and the mold cavity and also to provide space for thermal expansion of the nozzle tip. Examples of these designs are shown in U.S. Pat. Nos. 4,043,740, 4,286,941, 4,344,750 and 4,981,431. In these cases, small titanium seals are used to locally contain the melt channel between the nozzle and the mold cavity gate. However, the disadvantage of these designs is that they all employ titanium alloy seals. Although titanium has almost a quarter of the thermal conductivity of steel, it does not compare as well to the insulating properties of resin or air, the other materials used for insulation in nozzle construction. Therefore, while solving the resin degradation problem, these designs required more heat energy to be provided in order to render them effectively operable. Furthermore, the small seals were usually required to deflect in order to insure an effective seal. Due to imperfect manufacturing methods, the required sizes of the seals, bubble dimensions and other variables meant that some seals were deformed beyond their elastic limit and failed while others did not make contact at all. In both cases, resin leakage would occur.

U.S. Pat. Nos. 4,662,837 and 4,682,945 show another approach to the sealing problem. In these cases, a high temperature plastic seal is used to effect the seal between the nozzle and the mold cavity. Typically, plastic has thirty times less thermal conductivity than titanium alloys. However, the high temperature seal may be subject to cracking and degradation caused by high molding pressure and high processing temperatures. Further approaches are shown in U.S. Pat. Nos. 4,161,386, 4,266,723 and 5,028,227.

Accordingly, it is a principal object of the present invention to develop an effective hot runner nozzle assembly using a heated injection nozzle and a cooled mold cavity communicating therewith. It is a further object of the present invention to develop an improved hot runner nozzle assembly as aforesaid which is leak proof, conveniently prepared and easy to use in practice.

It is a still further object of the present invention to develop an improved hot runner nozzle assembly as aforesaid which enables expansion of the nozzle, uses a resin space or bubble adjacent the nozzle tip and is not subject to resin degradation in the resin space.

Further objects and advantages of the present invention will appear hereinbelow.

SUMMARY OF THE INVENTION

In accordance with the present invention, the foregoing objects and advantages may be readily obtained.

The hot runner nozzle assembly of the present invention comprises: a mold assembly including a mold cavity defined therein; an inlet port in the mold assembly communicating with the mold cavity; an injection nozzle for delivering molten resin through said inlet port having a nozzle tip with an opening therein aligned with said inlet port, said nozzle tip defining a resin space adjacent said nozzle tip opening; an insulating sleeve positioned around said nozzle between the mold assembly and nozzle insulating the nozzle from the mold assembly including a first downstream contact site between the sleeve and nozzle adjacent said resin space, a second upstream contact site between the sleeve and nozzle spaced from the first contact site, and an air space between the sleeve and nozzle separating the first and second contact sites; means adjacent said nozzle for heating said nozzle; and an insulating air gap between said nozzle and mold assembly; whereby there is substantially no contact between the nozzle and mold assembly so that the mold assembly may be cooled while the nozzle may be maintained at molding temperature and whereby on heating the nozzle expands against the insulating sleeve causing the sleeve to deflect.

Preferably, the nozzle includes a nozzle housing and a nozzle tip, with the nozzle tip held in the nozzle housing between the housing and sleeve, and wherein the first contact site is between the nozzle tip and sleeve and the second contact site is between the nozzle housing and sleeve. Preferably, sealing means are provided between the sleeve and mold assembly adjacent the resin space, wherein on heating the nozzle tip expands outwardly against the sleeve pressing the sleeve against the sealing means. The first contact site is preferably an interference fit and the second contact site is preferably a threaded engagement.

The hot runner nozzle assembly includes a hot runner manifold with a channel therein communicating with a channel in the nozzle. The nozzle channel may define a diverted or split nozzle channel adjacent the nozzle tip opening or if desired a single nozzle channel adjacent the nozzle tip opening.

The sleeve generally extends longitudinally around the nozzle from a downstream position adjacent the resin space to an upstream position spaced from the resin space. The nozzle housing preferably includes a housing shank surrounding the nozzle tip with the second contact site being between the sleeve and housing shank. The sleeve preferably includes an upstream angled end portion seated in an aligning, mating groove with a groove wall in the housing, with an air space between the end portion and the groove wall, whereby the sleeve is fitted in the groove and aligned with the nozzle.

The nozzle housing includes an upstream nozzle housing shoulder with the nozzle tip seated therein so that on heating all thermal expansion of the nozzle tip occurs at the downstream end of the nozzle tip adjacent the resin space.

In accordance with the present invention, the foregoing design achieves the objectives set forth hereinabove. The assembly is leak proof and readily manufacturable. Moreover, the assembly employs a minimum resin space and avoids thermal degradation of heat sensitive resins. Further objects and advantages of the present invention will appear hereinbelow.

BRIEF DESCRIPTION OF THE DRAWINGS

Other features and advantages of the present invention become more apparent from an examination of the succeeding specification when read in conjunction with the appended drawings in which.

DETAILED DESCRIPTION

Figure 1:
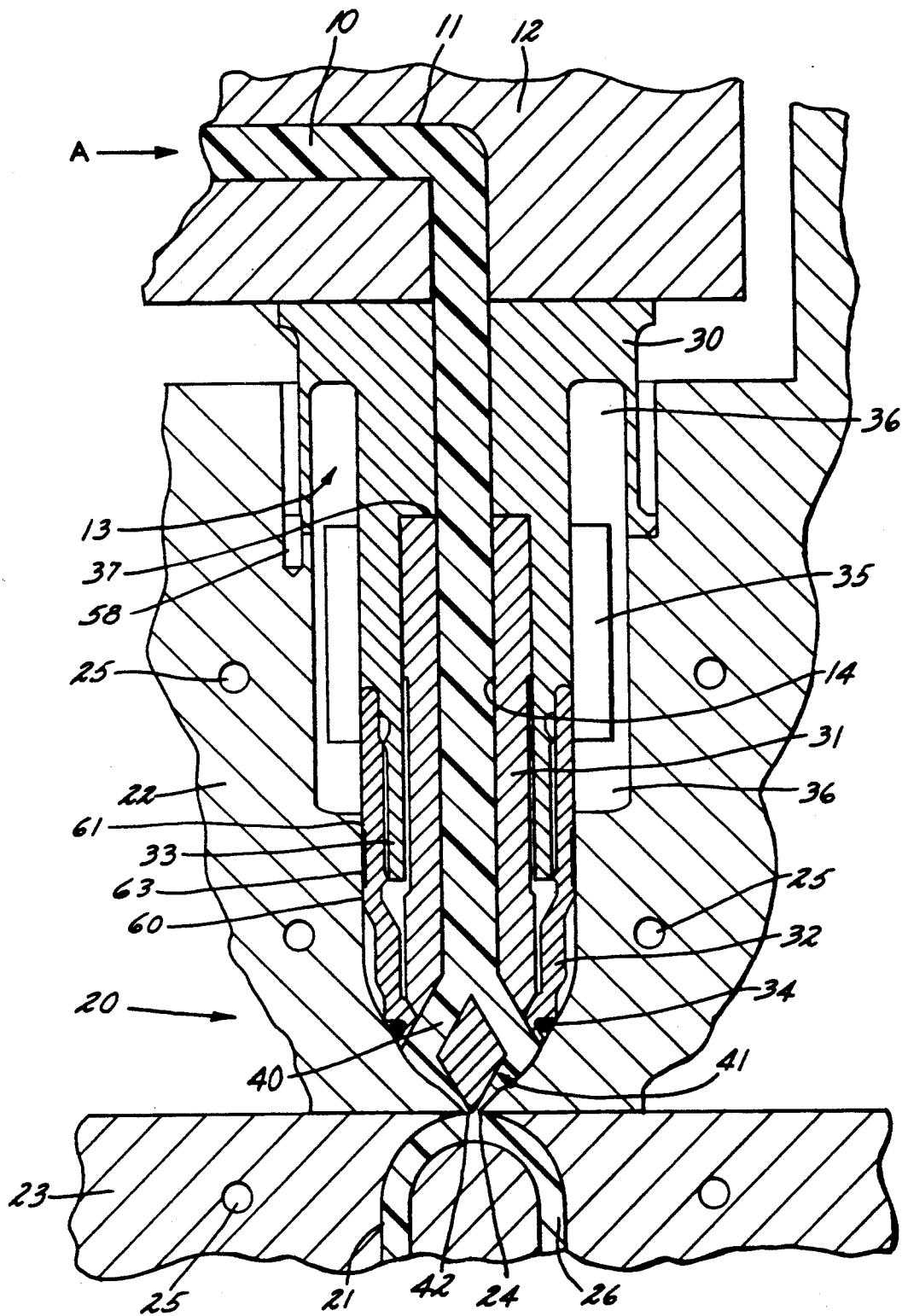
FIG. 1 is a sectional view of the mold assembly of the present invention.

Referring to the drawings, FIG. 1 shows an injection mold including a hot runner for the production of injection molded articles. Pressure molding means (not shown) advances molten plastic material 10 in the direction of arrow "A" into hot runner manifold channel 11 in hot runner 12 and thence to injection nozzle 13 via injection nozzle channel 14. Mold assembly 20 is provided having a mold cavity 21 therein with a configuration in the shape of the molded article to be formed in platens 22 and 23. The mold assembly has an inlet port 24 communicating with the mold cavity and aligned with the nozzle channel. The mold assembly is cooled as by cooling channels 25. Thus, molten plastic 10 flows from manifold channel 11 through nozzle channel 14 and through inlet port 24 into mold cavity 21 to form a molded article 26 therein.

For purposes of illustration, only a single nozzle and mold cavity have been shown herein; however, it should be understood that the hot runner manifold channel may feed a plurality of nozzles which in turn feed a plurality of mold cavities.

Nozzle 13 includes a nozzle housing 30 and a nozzle tip 31, with the nozzle tip held in the nozzle housing. An insulating sleeve 32 is positioned around nozzle 13 between mold assembly 20 and nozzle 13 insulating the nozzle from the mold assembly. Nozzle housing shank 33 extends around nozzle tip 31. Nozzle tip 31 is held in the nozzle housing between the housing and the insulating sleeve. The nozzle tip 31 is typically made from beryllium copper having high thermal conductivity and the sleeve 32 is typically made from titanium alloy having poor thermal conductivity properties. The insulating sleeve 32 preferably contains a sealing means 34 between the sleeve and the mold assembly which may be made from a high temperature elastomeric material. The sealing means 34 is optional and may be omitted if desired. The nozzle housing 30 includes a housing shoulder 37 seated against the upstream end of the nozzle tip.

Nozzle 13 is mounted in cooled mold assembly platen 22 and is heated by an appropriate heating means, such as band heater 35 adjacent the nozzle. The heated nozzle assembly and manifold are, to a large extent, surrounded by an air gap. Thus, as shown in FIG. 1, an insulating air gap 36 is provided between the nozzle and mold assembly, with the air gap acting as a thermal insulator.

Thus, molten resin 10 is conducted through manifold channel 11 and through the nozzle housing 30 and nozzle tip 31 by nozzle channel 14. Nozzle tip 31 contains a diverted channel 40 which feeds the resin into the gate bubble or resin space 41 and finally through nozzle opening 42 aligned with inlet port or gate 24 into mold cavity 21. The nozzle tip need not necessarily have a diverted channel, but could have a single straight through channel which would be a continuation of nozzle channel 14. Similarly, the nozzle channel may if desired include a valve pin which is movable from a position closing the inlet port or gate 24 to a position opening the inlet port, as is conventional in the art.

Figure 2:
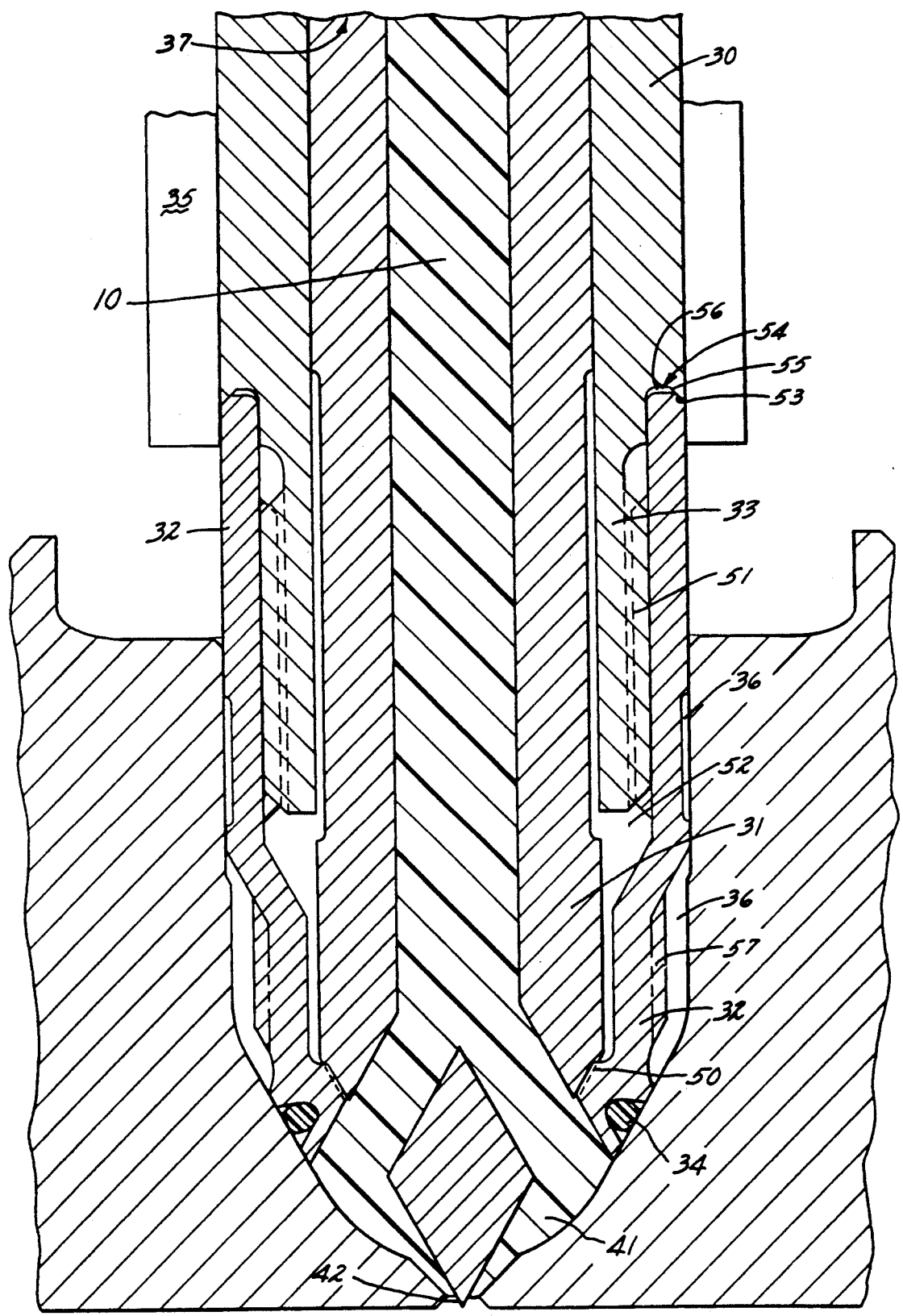
FIG. 2 is an enlarged sectional view of the nozzle tip-insulating sleeve of the present invention.

FIG. 2 shows the nozzle tip-insulating sleeve assembly in enlarged detail. Sleeve 32 extends longitudinally around nozzle 13 from a downstream position adjacent resin space 41 to an upstream position spaced from resin space 41. Sleeve 32 is affixed to nozzle 13 at a first downstream contact site 50 adjacent resin space 41 and a second upstream contact site 51 spaced from the resin space, with air space 52 between the sleeve and nozzle separating the first and second contact sites. The first contact site is preferably an interference fit where the nozzle tip 31 is embedded in the sleeve. The sleeve is preferably threaded onto nozzle 13 at the second contact site at nozzle housing shank 33. Sleeve 32 includes an upstream angled end portion 53 seated in an aligning, mating groove 54 in nozzle housing 30, with groove 54 including a groove wall 55 and with air space 56 between end portion 53 and groove wall 55. As the sleeve thread is tightened, the angled end portion seats in groove 54 forcing the sleeve inward against housing shank 33 and aligning the sleeve with the nozzle. A twelve-point wrench flange 57 may be provided on the sleeve to tighten the sleeve into the housing, which is prevented from rotating by dowel 58, see FIG. 1.

Thus, nozzle tip 31 is held between housing 30 and sleeve 32. As the tip is heated it expands longitudinally pressing against housing shoulder 37 to prevent resin leakage at this point and to cause all of the thermal expansion to occur at the downstream end of the nozzle tip adjacent resin space 41. This expansion occurs at the first contact site 50. Since the first contact site is an interference fit with no clearance in the cold condition, the heated tip presses against the inside of sleeve 32 causing it to deflect outwardly against seal 34 and mold assembly platen 22 and also against resin space 41. The high temperature seal 34 insures that resin is not forced past the sleeve-bubble contact point in the event that thermal expansion and sealing of the tip is not complete. This could happen for example if the resin is pressurized prematurely, that is, before normal operating temperature conditions are reached, or alternatively if the manufacturing accuracy of the components or the gate bubble geometry prevents contact from occurring at the operating temperature. If seal 34 is omitted, the space occupied by seal 34 would fill up with resin and the unit would operate effectively.

As shown in FIG. 1, air gaps are used throughout the assembly for insulating the various components, as air gaps 36. Also, while sleeve 32 includes two contact sites which operate in the cold condition to seal the tip in the housing, the sealing action is further enhanced as the tip thermally expands, as for example at groove 54 and angled end portion 53. In addition, outer surface of sleeve 32 contacts platen 22 at contact points 60 and 61 separated by air space 63 as clearly shown in FIG. 1.

Thus, the assembly of the present invention virtually eliminates leakage, minimizes bubble or resin space size and permits thermal expansion to effect a seal at high plastic pressure together with effective thermal insulation between the nozzle and mold assembly.

Figure 3:
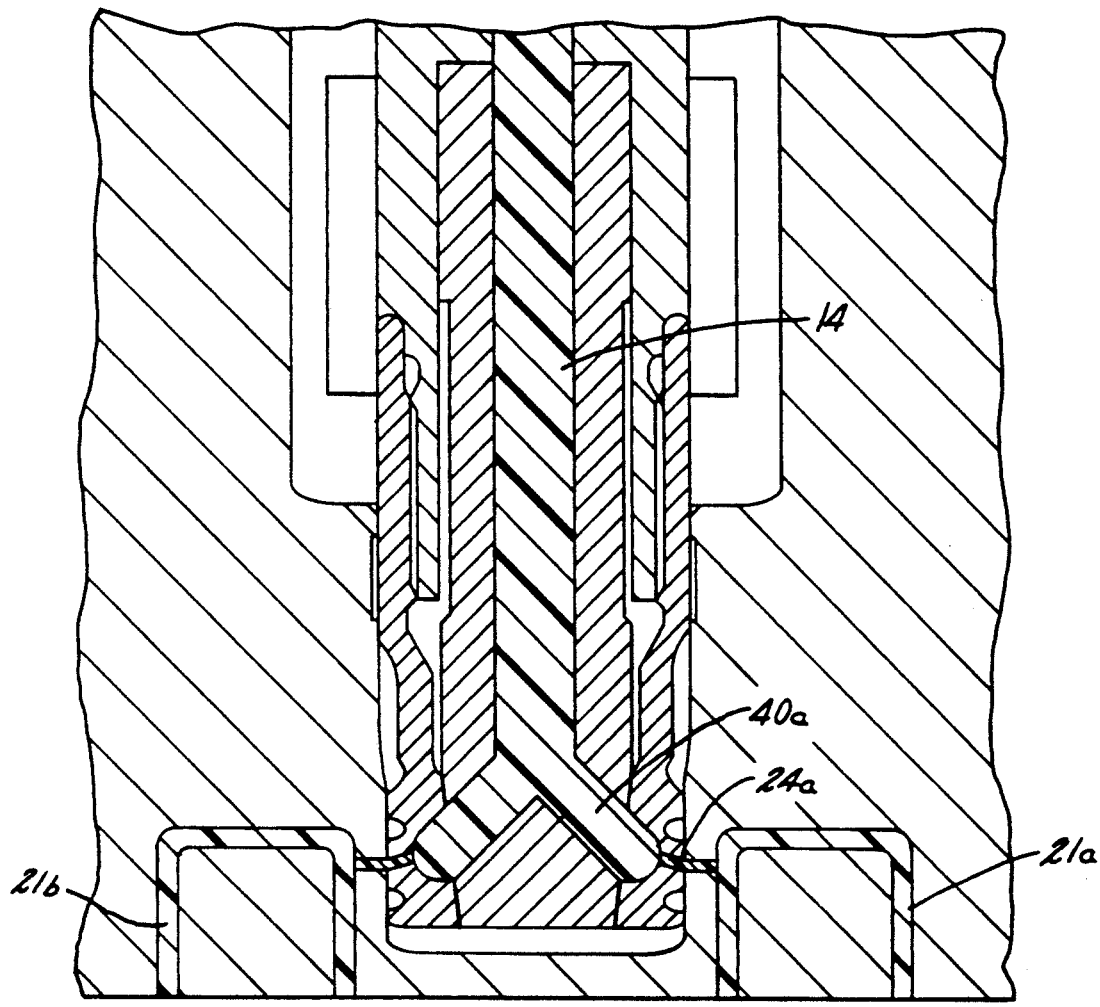
FIG. 3 is a sectional view similar to FIG. 1 showing an edge gating version.

The embodiment of FIG. 3 is similar to FIG. 1 showing an edge gating version with nozzle channel 14 leading to diverted channel 40a which in turn lead to at least two edge gates 24a which in turn lead to mold cavities 21a and 21b. Plural products may be formed as shown in FIG. 3 or alternatively a single large product may be formed.

Figure 4:
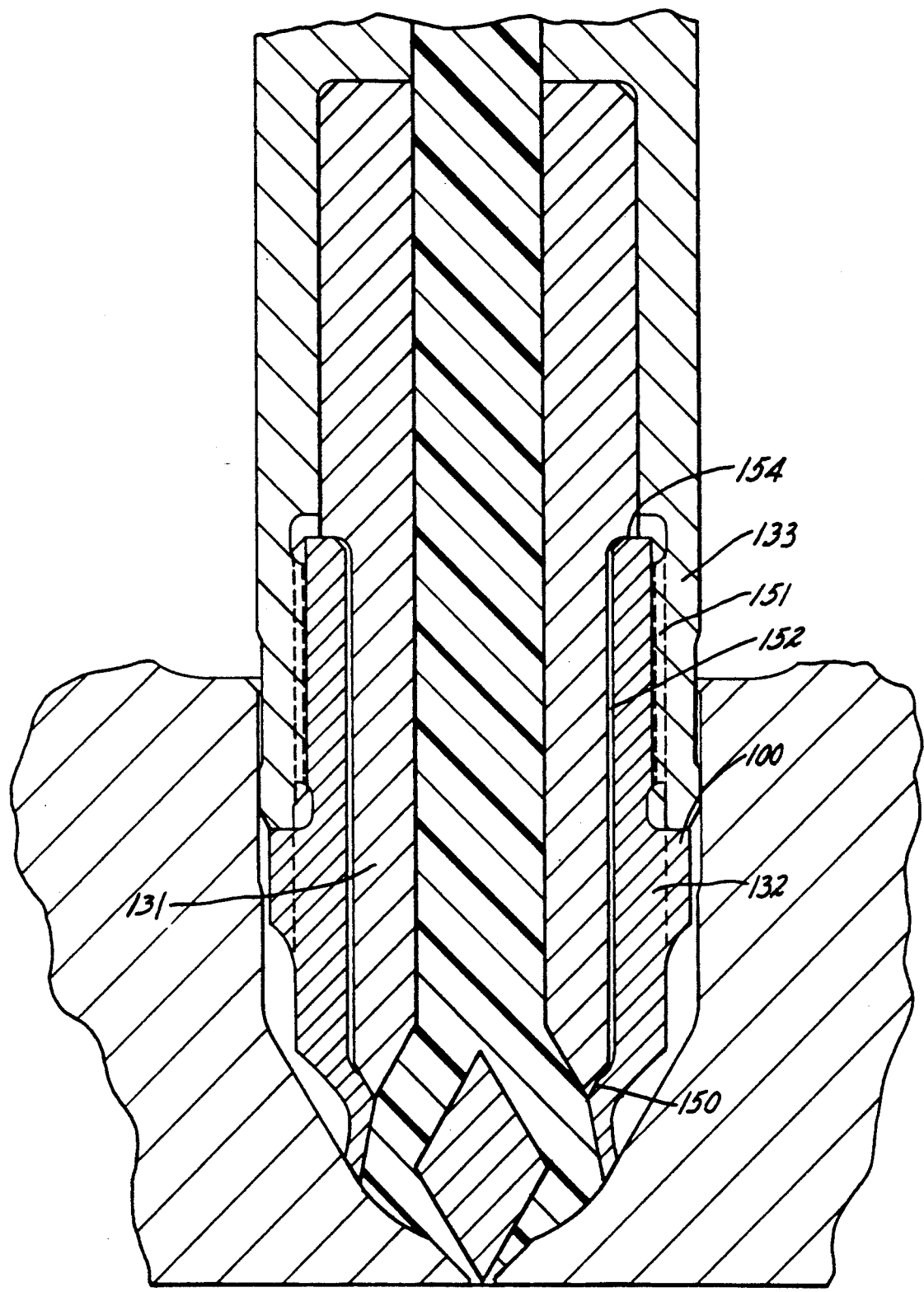
FIG. 4 is a sectional view similar to FIG. 1 showing an alternate embodiment.

The embodiment of FIG. 4 shows insulating sleeve 132 between nozzle tip 131 and nozzle housing shank 133. The insulating sleeve is threaded on the inside of nozzle housing shank 133 via second upstream contact site 151 rather than on the outside thereof as shown in FIG. 1. This means that the nozzle housing itself will fit into the area of the gate bubble or resin space and insure proper alignment. Also, in FIG. 1 the softer titanium alloy of the sleeve contacts the mold platen; whereas, in FIG. 4 the nozzle housing contacts the mold platen. Since the sleeve is softer than the housing, the embodiment of FIG. 1 will wear more rapidly than the embodiment of FIG. 4.

In addition, sleeve 132 includes shoulder 100 which contacts housing shank 133. The effect of this shoulder is to limit the amount of preload that can be applied to groove 154 by the threaded second contact site 151. In the embodiment of FIG. 1, this preload is not limited and the tightening of the insulator could overload the soft beryllium tip and cause premature failure at groove 154.

In FIG. 4, the first contact site is shown at 150 and the air space between the first contact site 150 and second contact site 151 is shown at 152.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Hot runner nozzle assembly which comprises:
a mold assembly including a mold cavity defined therein;
an inlet port in said mold assembly communicating with the mold cavity;
an injection nozzle for delivering molten resin through said inlet port having a nozzle tip with an opening therein aligned with said inlet port, said nozzle tip defining a resin space adjacent said nozzle tip opening;
an insulating sleeve positioned around said injection nozzle between the mold assembly and the injection nozzle insulating the injection nozzle from the mold assembly including a first downstream contact site between the sleeve and injection nozzle adjacent the resin space, a second upstream contact site between the sleeve and injection nozzle spaced from the first contact site, and an air space between the sleeve and injection nozzle separating the first and second contact sites;
means adjacent the injection nozzle for heating the nozzle; and
an insulating air gap between the injection nozzle and mold assembly; whereby there is substantially no contact between the injection nozzle and mold assembly so that the mold assembly may be cooled while the injection nozzle may be maintained at molding temperature and whereby on heating the injection nozzle expands against the insulating sleeve causing the sleeve to deflect.

2. Hot runner nozzle assembly according to claim 1 wherein the nozzle includes a nozzle housing and a nozzle tip with the nozzle tip held in the nozzle housing, with the first contact site being between the tip and sleeve and the second contact site being between the housing and sleeve.

3. Hot runner nozzle assembly according to claim 2 including a seal between the sleeve and mold assembly adjacent the resin space, wherein on heating, the nozzle tip expands outwardly against the sleeve pressing the sleeve against the sealing means.

4. Hot runner nozzle assembly according to claim 3 wherein the first contact site is an interference fit.

5. Hot runner nozzle assembly according to claim 4 wherein the second contact site includes a threaded engagement.

6. Hot runner nozzle assembly according to claim 1 including a hot runner manifold with a channel therein communicating with a channel in the nozzle.

7. Hot runner nozzle assembly according to claim 2 wherein said sleeve extends longitudinally around said nozzle from a downstream position adjacent the resin space to an upstream position spaced from the resin space.

8. Hot runner nozzle assembly according to claim 7 wherein said nozzle housing includes a housing shank surrounding said nozzle tip, with the second contact site being between the sleeve and housing shank.

9. Hot runner nozzle assembly according to claim 8 wherein said sleeve includes an upstream angled end portion seated in an aligning mating groove with a groove wall in said housing, with an air space between said end portion and said groove wall, whereby said sleeve is seated in said groove and aligned with said nozzle.

10. Hot runner nozzle assembly according to claim 3 wherein said nozzle tip is seated against an upstream nozzle housing shoulder so that on heating the thermal expansion of the nozzle tip occurs at the downstream end of the nozzle tip adjacent the resin space.

11. Hot runner nozzle assembly according to claim 6 wherein the nozzle channel defines a diverted nozzle channel adjacent said nozzle tip opening.

12. Hot runner nozzle assembly according to claim 11 wherein said diverted nozzle channel leads to at least two edge gates.

13. Hot runner nozzle assembly according to claim 1 wherein the nozzle includes a nozzle housing and a nozzle tip with the nozzle tip held in the nozzle housing, said housing including a nozzle shank surrounding the nozzle tip, wherein the sleeve is positioned between the shank and the tip.

14. Hot runner nozzle assembly according to claim 13 wherein said sleeve includes a shoulder contacting said shank limiting the movement of the sleeve with respect to the nozzle tip.

* * * * *